United States Patent
Jung et al.

(10) Patent No.: US 9,762,946 B2
(45) Date of Patent: Sep. 12, 2017

(54) DISPLAY APPARATUS AND CONTROL METHOD THEREOF

(71) Applicant: SAMSUNG ELECTRONICS CO., LTD., Suwon-si (KR)

(72) Inventors: Kyung-hee Jung, Suwon-si (KR); Jong-keun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/482,392

(22) Filed: Sep. 10, 2014

(65) Prior Publication Data

US 2015/0103249 A1    Apr. 16, 2015

(30) Foreign Application Priority Data

Oct. 10, 2013 (KR) .................. 10-2013-0120595

(51) Int. Cl.
*H04N 7/16* (2011.01)
*H04N 21/422* (2011.01)
(Continued)

(52) U.S. Cl.
CPC ....... *H04N 21/42204* (2013.01); *G08C 17/02* (2013.01); *G08C 23/04* (2013.01); *H04N 5/4403* (2013.01); *H04N 5/44513* (2013.01); *H04N 5/44543* (2013.01); *H04N 5/44582* (2013.01); *H04N 21/42206* (2013.01); *H04N 21/42225* (2013.01); *H04N 21/42228* (2013.01);
(Continued)

(58) Field of Classification Search
CPC ....... H04N 21/42204; H04N 21/42206; H04N 21/42207; H04N 21/42221; H04N 21/42225; H04N 21/42226; H04N 21/42228

USPC ............................ 725/37, 38, 143, 151, 153
See application file for complete search history.

(56) References Cited

U.S. PATENT DOCUMENTS 6,690,391 B1   2/2004  Proehl et al.
7,345,593 B2   3/2008  Park et al.
(Continued)

FOREIGN PATENT DOCUMENTS

EP   2 265 003 A2   12/2010
EP   2 645 728 A1   10/2013
(Continued)

OTHER PUBLICATIONS

International Search Report for PCT/KR2014/006831 dated Nov. 17, 2014 [PCT/ISA/210].
(Continued)

*Primary Examiner* — Jeremy Duffield
(74) *Attorney, Agent, or Firm* — Sughrue Mion, PLLC

(57) ABSTRACT

A display apparatus is provided, which includes a remote control signal receiver configured to receive a remote control signal transmitted from at least one among a first remote controller configured to control the display apparatus and at least one second remote controller configured to control at least one neighboring device, a display configured to display a list of function menus corresponding to the received remote control signal, according to information related to the received remote control signal, and a controller configured to control, on a condition that a function menu is selected from the list, an operation that corresponds to the selected function menu.

18 Claims, 11 Drawing Sheets

(51) Int. Cl.
*H04N 5/445* (2011.01)
*H04N 5/44* (2011.01)
*G08C 17/02* (2006.01)
*G08C 23/04* (2006.01)
*H04N 21/442* (2011.01)

(52) U.S. Cl.
CPC ... *H04N 21/44222* (2013.01); *G08C 2201/40* (2013.01); *G08C 2201/92* (2013.01); *H04N 21/42224* (2013.01); *H04N 2005/4444* (2013.01)

(56) References Cited

U.S. PATENT DOCUMENTS

| | | | |
|---|---|---|---|
| 9,241,114 B1* | 1/2016 | McQuaide, Jr. | H04N 5/268 |
| 2002/0047944 A1* | 4/2002 | Sato | H04N 21/42204 |
| | | | 348/734 |
| 2004/0143847 A1* | 7/2004 | Suzuki | H04N 21/4122 |
| | | | 725/61 |
| 2005/0102699 A1* | 5/2005 | Kim | G08C 17/00 |
| | | | 725/81 |
| 2006/0103625 A1 | 5/2006 | Mao et al. | |
| 2006/0242597 A1* | 10/2006 | Park | G06F 3/0482 |
| | | | 715/810 |
| 2008/0297656 A1 | 12/2008 | Saito | |
| 2009/0147137 A1* | 6/2009 | Bae | H04N 21/482 |
| | | | 348/554 |
| 2012/0162514 A1 | 6/2012 | Ryu et al. | |
| 2012/0194560 A1 | 8/2012 | Nagatomo | |
| 2012/0223820 A1 | 9/2012 | Park | |
| 2013/0258207 A1* | 10/2013 | Kim | H04N 21/42207 |
| | | | 348/734 |

FOREIGN PATENT DOCUMENTS

| | | |
|---|---|---|
| KR | 10-2005-0115392 A | 12/2005 |
| KR | 10-0546674 B1 | 1/2006 |
| KR | 10-2006-0055859 A | 5/2006 |
| KR | 10-2007-0070836 A | 7/2007 |
| KR | 20-2009-0012437 U | 12/2009 |
| KR | 10-2012-0099857 A | 9/2012 |

OTHER PUBLICATIONS

Written Opinion for PCT/KR2014/006831 dated Nov. 17, 2014 [PCT/ISA/237].

Communication dated Nov. 21, 2016 issued by European Patent Office in counterpart European Application No. 14852633.8.

* cited by examiner

190-E

DISPLAY APPARATUS AND CONTROL METHOD THEREOF

CROSS-REFERENCE TO RELATED APPLICATIONS

This application claims priority from Korean Patent Application No. 10-2013-0120595, filed on Oct. 10, 2013, in the Korean Intellectual Property Office, the disclosure of which is incorporated herein by reference in its entirety.

BACKGROUND

1. Field

Apparatuses and methods consistent with what is disclosed herein relate to displaying, and more particularly, to a display apparatus configured to display a list of function menus corresponding to a received remote control signal, and a method thereof.

2. Description of the Related Art

With the development of technologies, TVs launched today are equipped with a variety of functions. These TVs have enhanced performance and various functions unavailable to analogue TVs, and are used in connection with wired/wireless communications. It is possible to not only view television content on TV, but also experience a variety of contents, applications, or high definition display on TV associated with other devices or the Internet. Digital TVs (DTV), Internet protocol TVs (IPTV) or smart TVs are the representative examples.

Meanwhile, the above-mentioned TVs can be connected to other devices. For example, a TV can be connected to DVD, or set-top box (STB) which provides enhanced performance compared to analogue TVs or a variety of contents. A remote control can be used as a device to control the TV and devices connected thereto. This means that the number of remote controllers may increase, as the devices for operating in connection with TV increase. Accordingly, problem arises, because it is difficult to manage more than one remote controller.

An integrated remote controller may be used, to control the TV and all the devices connected thereto. Because a remote controller has limited number of buttons, it is necessary to assign a plurality of functions to each button. Accordingly, a TV may display all the control functions assigned to a button on screen, when a user presses the button, and the user has to find a desired function from among the plurality of displayed control functions, which is quite cumbersome.

SUMMARY

Exemplary embodiments may overcome the above disadvantages and other disadvantages not described above. Also, exemplary embodiments are not required to overcome the disadvantages described above, and an exemplary embodiment of the present inventive concept may not overcome any of the problems described above.

One or more exemplary embodiment provides a display apparatus configured to store information about one or more remote control signals and display a list of function menus corresponding to the received remote control signals, and a method thereof.

In one exemplary embodiment, a display apparatus is provided, which may include a remote control signal receiver configured to receive a remote control signal transmitted from at least one among a first remote controller configured to control the display apparatus and at least one second remote controller configured to control at least one neighboring device, a display configured to display a list of function menus corresponding to the received remote control signal, according to information related to the received remote control signal, and a controller configured to control, on a condition that a function menu is selected from the list, an operation that corresponds to the selected function menu.

The list may display one or more first function menus selected by the first remote controller and executed on the display apparatus, and one or more second function menus selected by the at least one second remote controller and executed on the at least one neighboring device.

The controller may construct the list by arranging the function menus with reference to a frequency of selection made by a user.

The display apparatus may additionally include an interface configured to communication with the at least one neighboring device. When a function menu executable on the at least one neighboring device is selected from the function menus displayed on the list, the controller may transmit a corresponding remote control signal to the at least one neighboring device via the interface.

The controller may display a cursor to select the function menus on the list and move the cursor configured to aid in the selection of the function menu in accordance with a remote control signal received from the first remote controller.

The list may be divided into at least one page configured to display one or more first function menus selected by the first remote controller and executed on the display apparatus and one or more second function menus selected by the at least one second remote controller and executed on the at least one neighboring device.

The list may be divided into a plurality of pages, and a first page of the plurality of pages may display an arrangement of one or more first menu functions selected by the first remote controller and executed on the display apparatus, and a second page of the plurality of pages may display an arrangement of one or more second function menus selected by the at least one second remote controller and executed on the at least one neighboring device.

The at least one neighboring device may include a plurality of different types of devices, and the at least one second remote controller may include a plurality of remote controllers corresponding to the plurality of different types of devices, respectively.

The display apparatus may further include a storage configured to store the information about the received remote control signal, The display may further comprise a communicator configured to receive update information about the received remote control signal. The controller may be further configured to adjust the stored information based on the update information.

The information may include at least one of a control code included in the remote control signal, identification information of the neighboring device, and identification information of the second remote controller.

In one exemplary embodiment, a control method of a display apparatus is provided, which may include receiving a remote control signal transmitted from at least one among a first remote controller configured to control the display apparatus and at least one second remote controller configured to control at least one neighboring device, displaying a list of function menus corresponding to the received remote control signal, according to the information related to the received remote control signal, and, on a condition that a function menu is selected from the list, controlling an operation that corresponds to the selected function menu.

The list may display one or more first function menus selected by the first remote controller and executable on the display apparatus, and one or more second function menus selected by the at least one second remote controller and executable on the at least one neighboring device.

The displaying may include displaying the list by arranging the function menus with reference to a frequency of selection made by a user.

The control method may additionally include communicating with the at least one neighboring device, and the performing the control operation may include, on a condition that the selected function menu is executable on the at least one neighboring device, transmitting a corresponding remote control signal to the at least one neighboring device.

The control method may additionally include displaying a cursor to select the function menus on the list, and moving the cursor in accordance with a remote control signal received from the first remote controller.

The list may be divided into at least one page, in which the at least one page may display one or more first function menus selected by the first remote controller and executable on the display apparatus, and one or more second function menus selected by the at least one second remote controller and executable on the at least one neighboring device.

The list may be divided into a plurality of pages, and a first page of the plurality of pages may display an arrangement of one or more menu functions selected by the first remote controller and executable on the display apparatus, and a second page of the plurality of pages may display an arrangement of one or more second function menus selected by the at least one second remote controller and executable on the at least one neighboring device.

The at least one neighboring device may include a plurality of different neighboring devices, and the at least one second remote controller may include a plurality of remote controllers corresponding to the plurality of different types of neighboring devices.

The control method may further include storing information about the received remote control signal in a storage.

The information may include at least one of a control code included in the remote control signal, identification information of the neighboring device, and identification information of the second remote controller.

According to various exemplary embodiments, a user can easily search and select a control function that he wishes to select, by manipulating a remote controller which is very simple.

BRIEF DESCRIPTION OF THE DRAWINGS

The above and/or other aspects of one or more exemplary embodiment will be more apparent by describing with reference to the accompanying drawings, in which.

DETAILED DESCRIPTION

Figure 1:
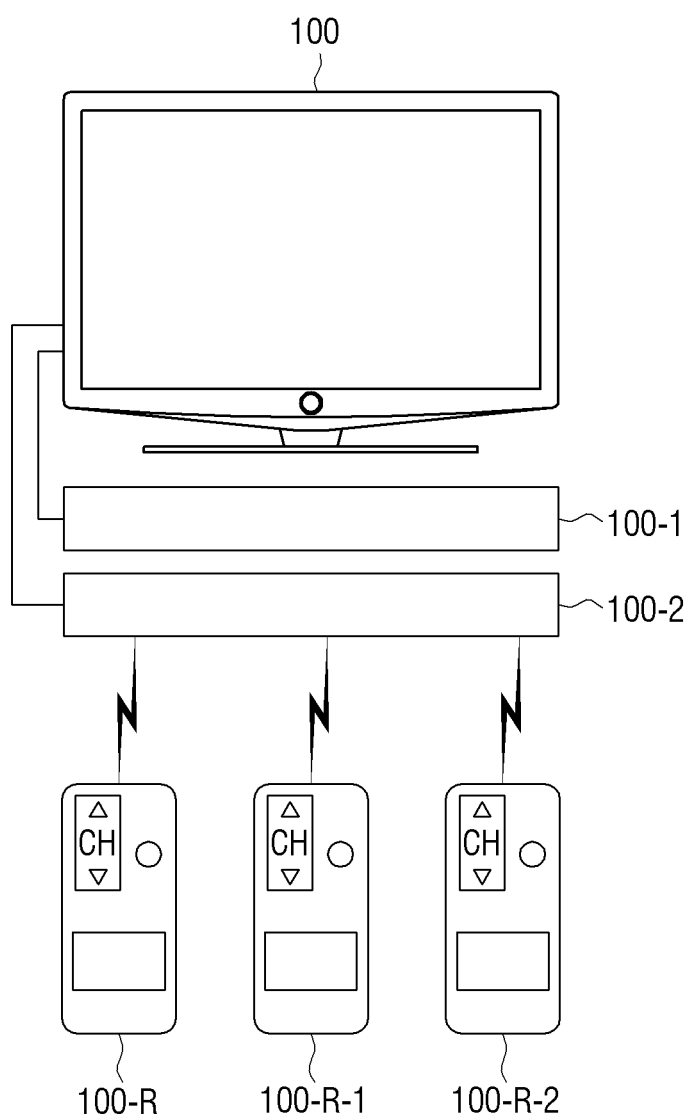
FIG. 1 is a block diagram of display system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding. Accordingly, it is apparent that the exemplary embodiments can be carried out without those specifically defined matters. Also, well-known functions or constructions are not described in detail since they would obscure the disclosure with unnecessary detail.

FIG. 1 is a block diagram of a display system 1000 according to an exemplary embodiment. The display system 1000 according to an exemplary embodiment includes a display apparatus 100, a first neighboring device 100-1, a first remote control 100-R configured to transmit a remote control signal to the display apparatus 100, and a second remote control 100-R-1 configured to transmit a remote control signal to the neighboring device. As used herein, the 'first neighboring device 100-1' may refer to a plurality of different types of devices, and the 'second remote control 100-R-1' may refer to a plurality of remote controllers each corresponding to one or more of the plurality of neighboring devices. Referring to FIG. 1, the display system 1000 according to an exemplary embodiment includes a display apparatus 100, a first neighboring device 100-1, a second neighboring device 100-2, a first remote controller 100-R, a second remote controller 100-R-1, and a third remote controller 100-R-2. Referring to the exemplary embodiment illustrated in FIG. 1, there may be two neighboring devices and two corresponding remote controllers are implemented, but not limited thereto. Alternatively, there may be one neighboring device and one corresponding remote controller, or three or more devices and remote controllers.

The first remote controller 100-R may generate a first remote control signal to control operation of the display apparatus 100. The display apparatus 100 may receive a first remote control signal from the first remote controller 100-R. The display apparatus 100 may be a TV, in which case the first remote controller 100-R may be an integrated remote controller which is configured to control all the devices including TV, the first neighboring device, and the second neighboring device 100-2.

The second remote controller 100-R-1 may generate a second remote control signal to control the operation of the first neighboring device 100-1. The first neighboring device 100-1 may receive a second remote control signal from the second remote controller 100-R-1. The third remote controller 100-R-2 may generate a third remote control signal to control the operation of the second neighboring device 100-2. The second neighboring device 100-2 may receive a third remote control signal from the third remote controller 100-R-2. As non-limiting examples, the first and second neighboring devices 100-1, 100-2 may be a VCR, a DVD player, a Blu-ray disc player, a DIVX player, a set-top box, a personal computer, or a home theater.

The display apparatus 100, the first neighboring device 100-1, and the second neighboring device 100-2 may generally be arranged adjacent to each other. Instead of being transmitted linearly to a specific device only, a remote control signal can be transmitted to neighboring devices too. Accordingly, the first, second and third remote control signals may be transmitted to the display apparatus 100, the first neighboring device 100-1, and the second neighboring device 100-2, and others. That is, the first remote control signal may be transmitted to the display apparatus 100, the first neighboring device 100-1 and the second neighboring device 100-2. Likewise, the second remote control signal may be transmitted to the display apparatus 100, the first neighboring device 100-1 and the second neighboring device 100-2, and the third remote control signal may be transmitted to the display apparatus 100, the first neighboring device 100-1 and the second neighboring device 100-2.

The first remote control signal, the second remote control signal, and the third remote control signal may be infrared (IR) signal, Bluetooth (BT) signal, Zigbee signal, or WiFi signal. The remote control signal may include a key code signal and a function signal. That is, a remote control signal may be a combination of the key code signal and the function signal.

The key code signal may correspond to a device which is configured to receive a remote control signal from the corresponding remote controller and perform a function that corresponds to the received signal. For example, a first key code signal may be a signal that corresponds to a device 'BBB' by a company 'AAA', and a second key code signal may correspond to a device 'DDD' by a company 'CCC'. That is, the key code signal may be a signal to identify a manufacturer, a product group, or a product model. Further, the function signal may be a signal to perform a specific operation of a device that matches the key code signal. For example, a first function signal may be a turn-on signal to turn on power, and a second function signal may be a volume up signal to increase volume. Accordingly, while the second remote control signal, which is a combination of a key code signal and a function signal, may be transmitted to not only the first neighboring device 100-1, but also to the display apparatus 100 and the second neighboring device 100-2, the key code signal of the second remote control signal corresponds to the first neighboring device 100-1. Accordingly, the first neighboring device 100-1 is controlled in accordance with the second remote control signal.

The display apparatus 100 according to an exemplary embodiment may receive the first remote control signal, the second remote control signal, and the third remote control signal, and store the received first, second and third remote control signals. That is, the display apparatus 100 may store the key code signal and the function signal contained in each of the first, second and third remote control signals. Further, the display apparatus 100 may store a frequency of receiving remote control signals, which will be explained in detail below.

Meanwhile, referring to FIG. 1, the display apparatus 100 may be connected to the first neighboring device 100-1 and the second neighboring device 100-2, in which case the display apparatus 100 may include a first interface connected to the first neighboring device 100-1 to transmit and receive data, and a second interface connected to the second neighboring device 100-2 to transmit and receive data.

Figure 2:
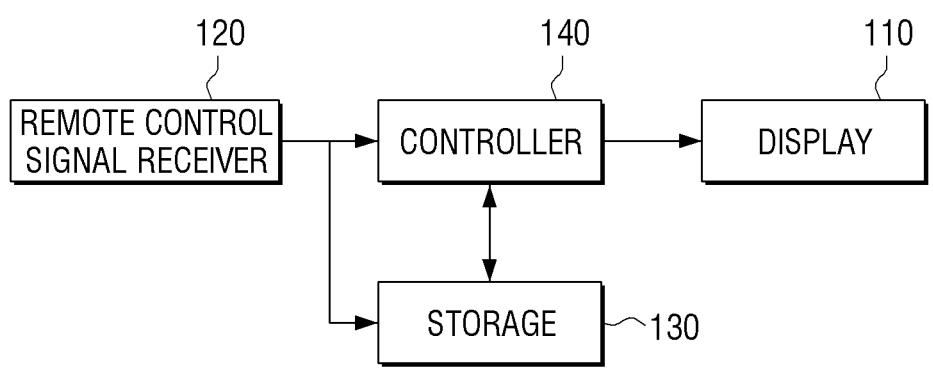
FIG. 2 is a block diagram of a display apparatus according to an exemplary embodiment.

FIG. 2 is a block diagram of a display apparatus 100 according to an exemplary embodiment. Referring to FIG. 2, the display apparatus 100 includes a display 110, a remote control signal receiver 120, a storage 130, and a controller 140.

The remote control signal receiver 120 receives a first remote control signal from the first remote controller 100-R. Further, the remote control signal receiver 120 may receive remote control signal transmitted to the neighboring device. That is, the remote control signal receiver 120 may receive a second remote control signal that the second remote controller 100-R-1 transmits to the first neighboring device 100-1, and a third remote control signal that the third remote controller 100-R-2 transmits to the second neighboring device 100-2. That is, the remote control signal receiver 12 may receive a remote control signal transmitted from at least one of: the first remote controller 100-R to control the display apparatus 100, the second remote controller 100-R-1 to control the first neighboring device 100-1, and the third remote controller 100-R-2 to control the second neighboring device 100-2.

Meanwhile, when the remote control signal receiver 120 receives the first remote control signal, the controller 140 may perform an operation that corresponds to the received first remote control signal, in which case the storage 130 may store information about the received first remote control signal. The information about the first remote control signal may include information about key code signal and function signal that are included in the first remote control signal. The information about the first remote control signal may refer to identification information of the display apparatus 100, or the control code of the display apparatus 100. Further, depending on the information stored at the storage 130, the display apparatus 100 may display a list of function menus that correspond to the received first remote control signal.

Meanwhile, the storage 130 may store not only the information about the remote control signal transmitted from the remote controller to control the display apparatus 100, but also the information about remote control signals transmitted from the remote controllers configured to control the neighboring devices. That is, since the remote control signal receiver 120 receives the second remote control signal and the third remote control signal, the storage 130 may store the information that is included in each of the second remote control signal and the third remote control signal. Accordingly, the storage 130 may store information about a key code signal and a function signal of the second remote control signal received from the second remote controller 100-R-1, and information about the key code signal and function signal of the third remote control signal received from the third remote controller 100-R-2. The information about the second remote control signal may include identification information of the first neighboring device 100-1, identification information of the second remote controller 100-R-1, or the control code of the first neighboring device 100-1, and the information about the third remote control signal may include identification information about the second neighboring device 100-2, identification information about the third remote controller 100-R-2, and the control code about the second neighboring device 100-2.

Meanwhile, the storage 130 may store the information about the received remote control signal depending on the frequency of selection made by the user. That is, the storage 130 may store the information in the order of the more frequently selected key code signal and function signal. Accordingly, when the user inputs a command to display a preference function into the display apparatus 100 through the first remote controller 100-R, the controller 140 may construct a list by arranging the function menus with reference to the frequency of selection made by the user. In one exemplary embodiment, the list may display one or more function menus that are executed in the display apparatus 100 and the neighboring devices. That is, the list may display one or more first function menus that are selected by the first remote controller 100-R and executed on the display apparatus 100, one or more second function menus that are selected by the second remote controller 100-R-1 and executed on the first neighboring device 100-1, and one or more third function menus that are selected by the third remote controller 100-R-2 and executed on the second neighboring device 100-2. When one function menu is selected from the list, the controller 140 may perform a control operation that corresponds to the selected function menu.

Meanwhile, the controller 140 may display a cursor to select the respective function menus on the list. Accordingly, the controller 140 may move the cursor in accordance with the remote control signal that is received from the first remote controller 100-R. This will be explained in detail below.

Figure 3:
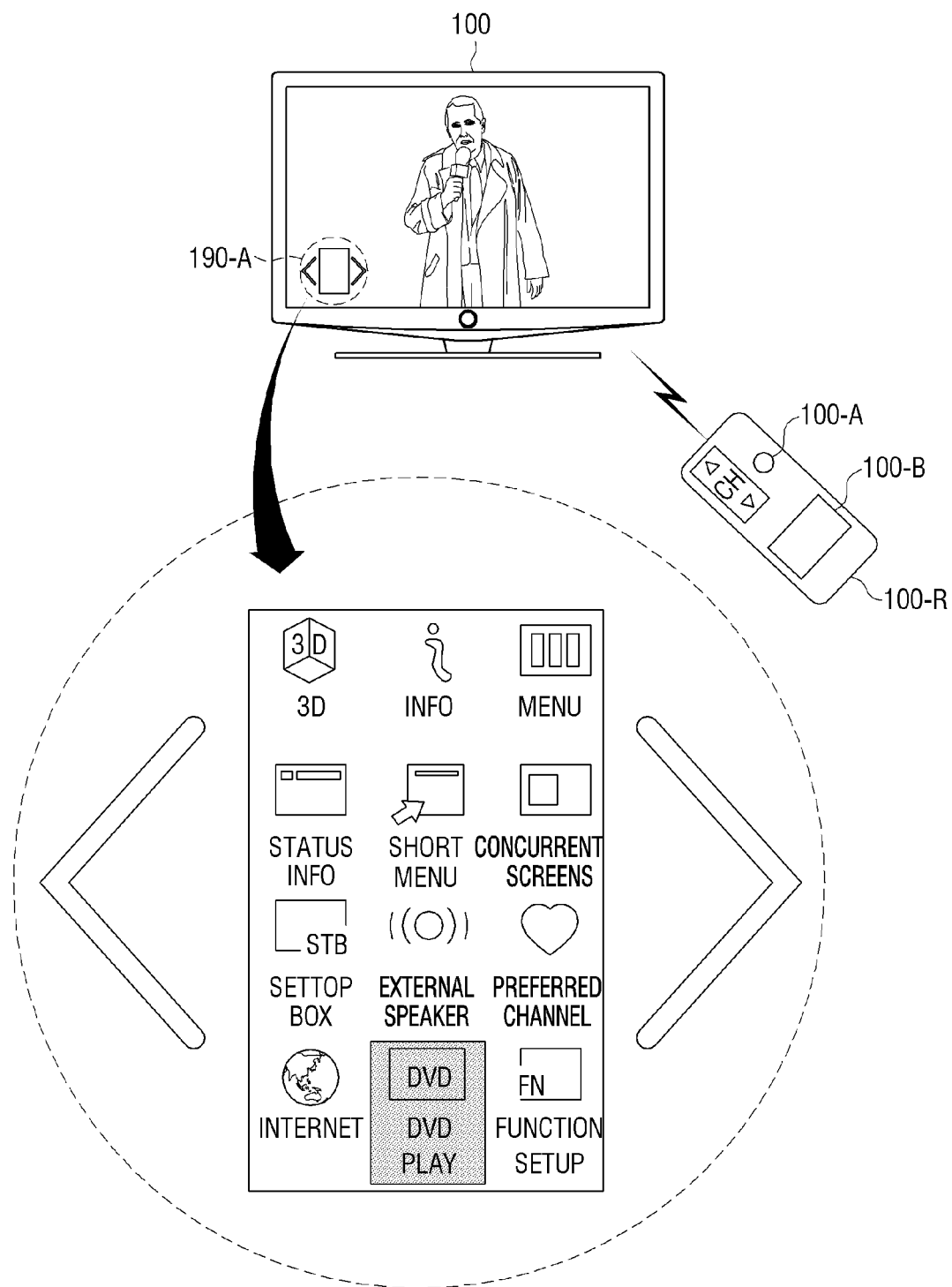
FIG. 3 illustrates a display screen according to an exemplary embodiment.

FIG. 3 illustrates a screen of the display 110, according to an exemplary embodiment. Referring to FIG. 3, when the display apparatus 100 is turned on, the user may press an integrated button 100-A arranged on the first remote controller 100-R. The integrated button 100-A, when implemented in the first remote controller 100-R, may be a button that is provided to comprehensively control not only the display apparatus 100, but also one or more of the neighboring devices.

When the user presses the integrated button 100-A arranged on the first remote controller 100-R, referring to FIG. 3, the controller 140 may form a menu area 190-A on one side of the screen of the display 110, displaying a list in the menu area 190-A. That is, as explained above, since the storage 130 may store information about remote control signal to control the display apparatus 100, and information about remote control signal to control one or more neighboring devices, the controller 140 may display the information stored in the storage 130. That is, the controller 140 may arrange and display one or more first function menus that are selected by the first remote controller 100-R and executed on the display apparatus 100, and one or more second function menus that are selected by the second remote controller 100-R-1 and executed on the neighboring device.

Since the storage 130 may store the information about the received remote control signal in the order of higher frequency of selection made by the user, the controller 140 may construct the list by arranging the function menus in the order of higher frequency of selection made by the user. The menu area 190-A in FIG. 3 displays the one or more function menus of the display apparatus 100 and one or more function menus of the first neighboring device 100-1, together. That is, one menu area 190-A may display the function menus of the display apparatus 100 and the function menus of the first neighboring device 100-1 which are arranged in the order of higher frequency of selection by the user.

The function menus displayed in the menu area 190-A may be brief text to indicate corresponding control function, along with icons that allow the user to intuitively perceive the corresponding control function. The user may select a desired function menu, by touching on the touch pad 100-B arranged on the first remote controller 100-R. The controller 140 may display a cursor to select respective function menus on the list, and move the cursor in accordance with the remote control signal that is received from the first remote controller 100-R.

Meanwhile, the list may be divided into one or more pages. Accordingly, the user may change to different page by flicking or swiping on the touch pad 100-B in a horizontal direction.

Further, the plurality of function menus displayed on the first page are those that are more frequently selected by the user compared to the plurality of function menus displayed on the second page, and the plurality of function menus displayed on the second page are those that are more frequently selected by the user compared to the plurality of function menus displayed on the third page.

Figure 4:
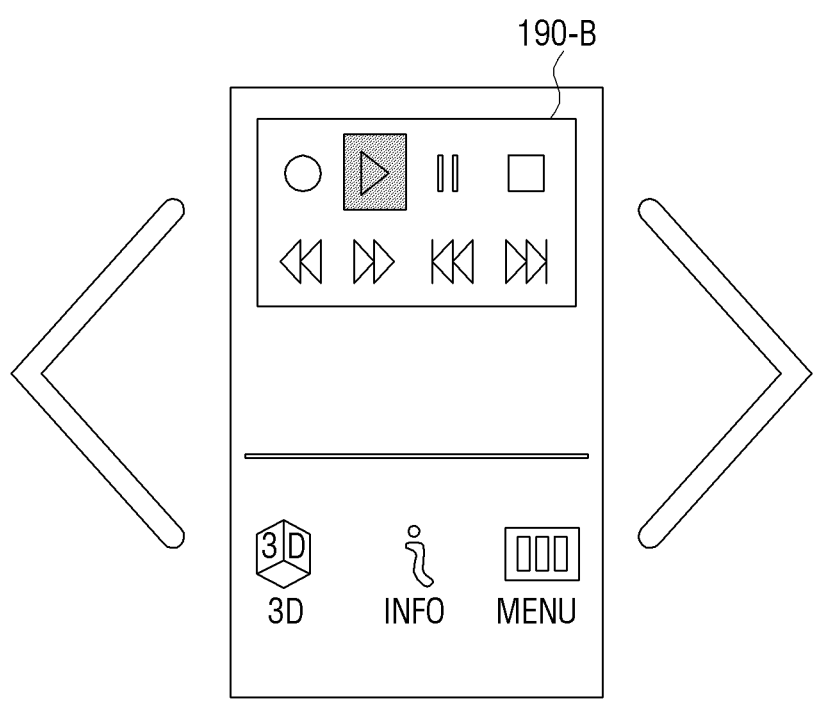
FIG. 4 illustrates a display screen according to an exemplary embodiment.

FIG. 4 illustrates a screen of the display 110 according to an exemplary embodiment. That is, FIG. 4 illustrates a screen following the screen that is shown in FIG. 3.

The user may move the cursor to an intended function menu by making touch & drag movement on the touch pad 100-B. When the user selects DVD playback function menu, the following menu area 190-A may be a playback function area 190-B as the one illustrated in FIG. 4. With the playback function area 190-B being displayed, the user may move the cursor to the intended function menu by making a touch & drag on the touch pad 100-B. When the cursor is placed on the intended function menu, the user may request the execution of the function by touching on the touch pad 100-B.

Referring to FIG. 4, although the exemplary embodiment is explained with reference to an example of the DVD playback function menu, this is merely an example. Accordingly, the controller 140 may collectively display a plurality of function menus that are associated with each other, such as, channel-up function and channel-down function, volume-up function and volume-down function, or a plurality of content playback functions.

Figure 5:
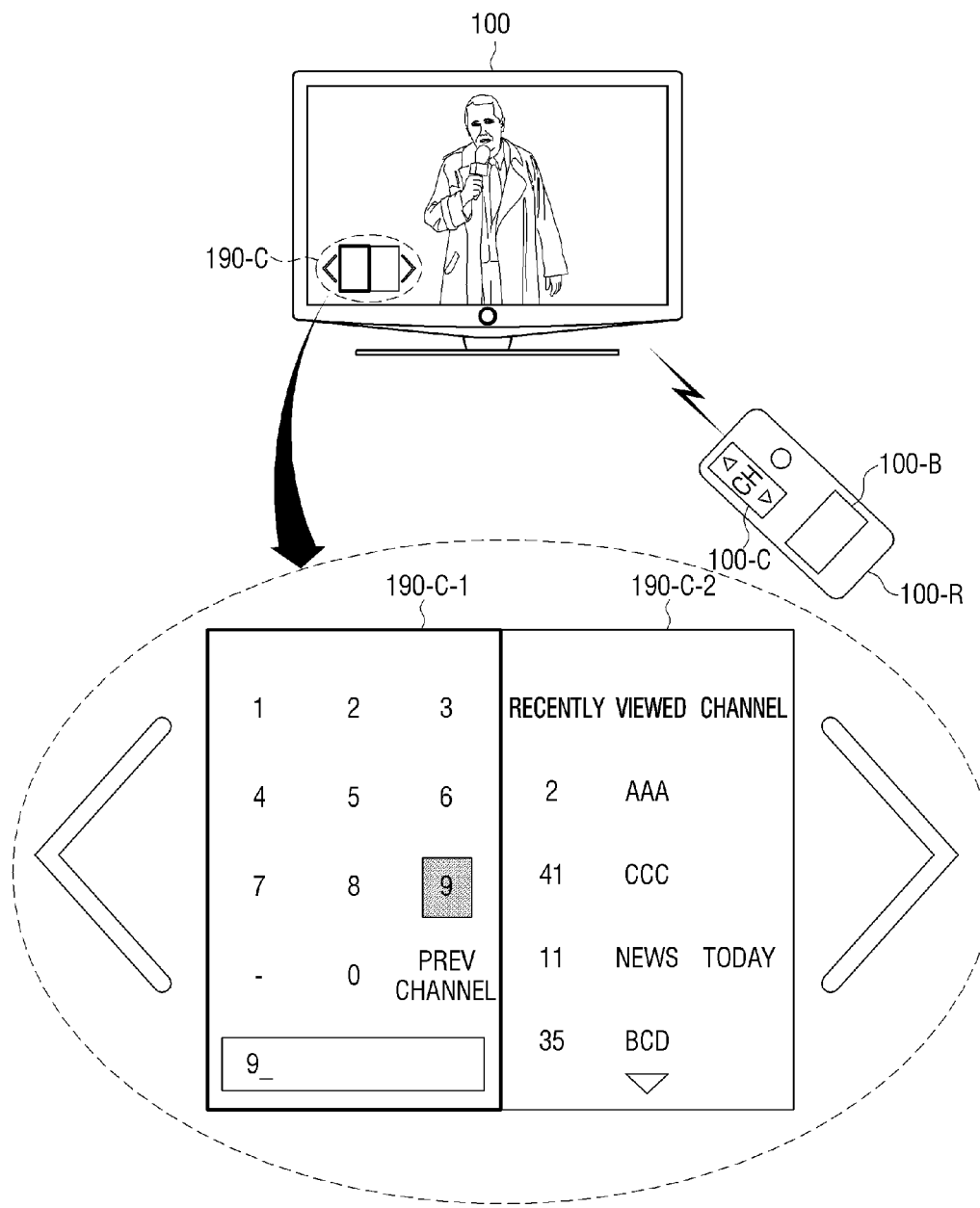
FIG. 5 illustrates a display screen according to another exemplary embodiment.
Figure 6:
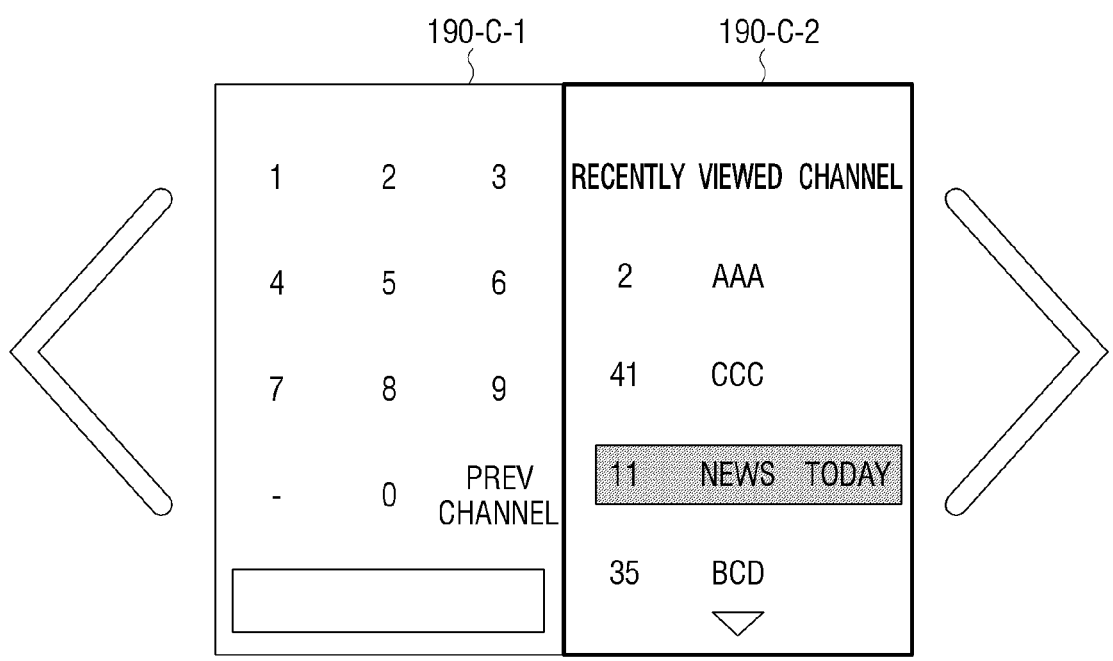
FIG. 6 illustrates a display screen according to yet another exemplary embodiment.

FIGS. 5 and 6 illustrate screens of the display 110 according to another exemplary embodiment. Referring to FIG. 5, with the display apparatus 100 on, the user may press a channel button 100-C arranged on the first remote controller 100-R. The channel buttons 100-C may include a top button to sequentially search the channels assigned with higher broadcast channel numbers, a bottom button to sequentially search the channels assigned with lower broadcast channel numbers, or an intermediate button to search the channels on the channel area 190-C formed on the display 110, among the currently-broadcast channels. The channel search of the display apparatus 100 with the top and bottom buttons may be performed in a known manner, and therefore, will not be specifically explained herein for the sake of brevity.

When the user presses the intermediate button of the channel button 100-C, referring to FIG. 5, the controller 140 may form the channel area 190-C on one side of the screen of the display 110.

The channel area 190-C may include a first channel area 190-C-1 and a second channel area 190-C-2. The first channel area 190-C-1 is where the user inputs a channel number on the touch pad 100-B in response to which a channel intended by the user is displayed. The second channel area 190-C-2 is where the user can view recently-viewed channel numbers in the order of higher frequency of selection. Meanwhile, the user may select to have one of the first channel area 190-C-1 and the second channel area 190-C-2 be active, by flicking or swiping over the touch pad 100-B in a horizontal direction.

FIG. 5 illustrates an example where the first channel area 190-C-1 is active. The example may locate the cursor on an intended number by making touch & drag movement on the touch pad 100-B. With the cursor being located on the intended number, the user may select the number by touching on it. In this manner, the user may select a channel number and thus directly go to the channel.

Meanwhile, when the user flicks or swipes in a state that the first channel area 190-C-1 is active, referring to FIG. 6, the first channel area 190-C-1 becomes inactive, and the second channel area 190-C-2 becomes active. Since the storage 130 may store the channel numbers selected by the user, the controller 140 may display the channel numbers stored in the storage 130. That is, the controller 140 may arrange the channel numbers that are selected by the first remote controller 100-R and display the same.

Since the storage 130 may store the channel numbers in the order of higher frequency of selection, the controller 140 may arrange the channel numbers in the order of higher frequency of selection by the user and construct a list. The second channel area 190-C-2 illustrated in FIG. 6 displays the channel numbers which are arranged in the higher frequency of selection by the user.

Meanwhile, the channel numbers displayed on the second channel area 190-C-2 may be displayed along with corresponding channel names. The user may select a channel number by making touch & drag movement on the touch pad 100-B arranged on the first remote controller 100-R. The controller 140 may display a cursor to select respective channel numbers on the list, and move the cursor in accordance with a remote control signal received from the first remote controller 100-R.

Meanwhile, the list of channel numbers may be divided into one or more pages. Accordingly, the user may view another page by flicking or swiping over the touch pad 100-B in vertical direction. Further, the plurality of channel numbers displayed on the first page are those that are more frequently selected by the user compared to the plurality of channel numbers displayed on the second page, and the plurality of channel numbers displayed on the second page are those that are more frequently selected by the user compared to the plurality of channel numbers displayed on the third page.

Figure 7:
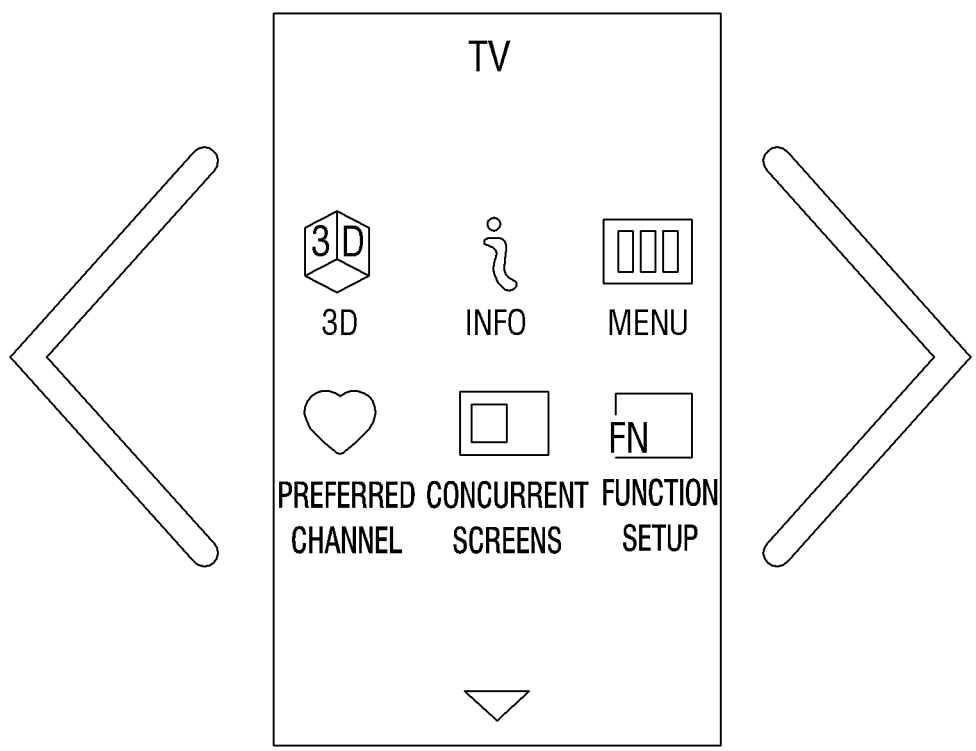
FIGS. 7 and 8 illustrate a display screen according to yet another exemplary embodiment.
Figure 8:
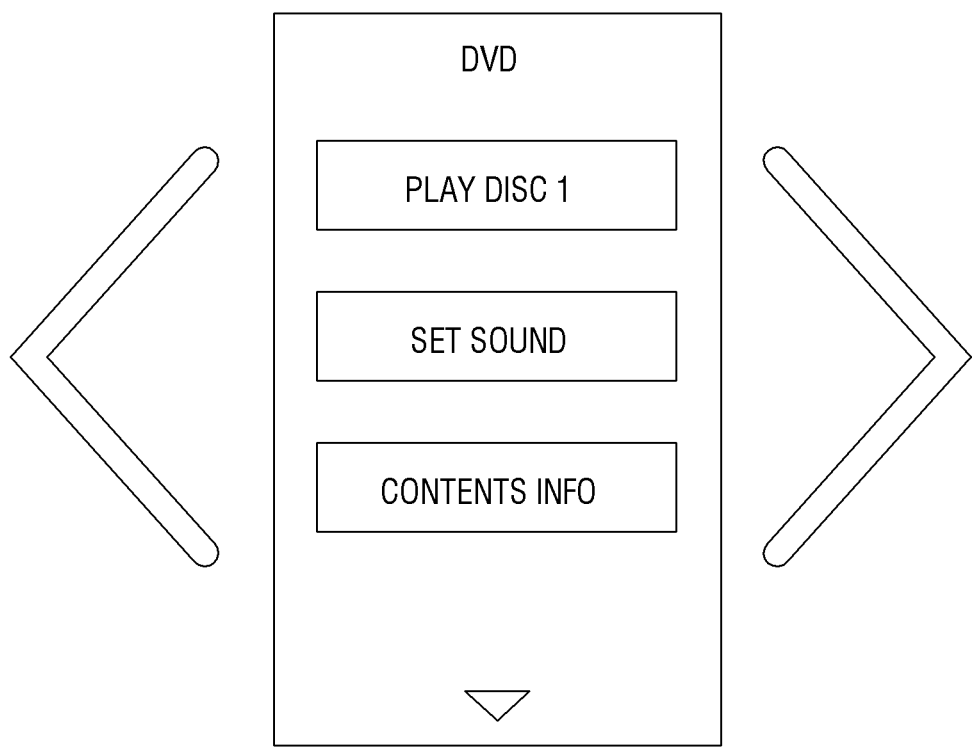

FIGS. 7 and 8 illustrate screens of the display 110 according to yet another exemplary embodiment. According to another exemplary embodiment, a list may be divided into a plurality of pages, in which each page may display an arrangement of one or more function menus that are selected by different remote controllers and executed by different devices.

FIG. 7 illustrates the first page among the plurality of pages, on which the first device menu area 190-D is displayed. Referring to FIG. 7, the first device menu area 190-D may display a function menu to control the display apparatus 100. The first device may refer to the display apparatus 100. Accordingly, among the plurality of pages, the first page may display an arrangement of one or more first function menus that are selected by the first remote controller 100-R and executed on the display apparatus 100. The manner of displaying a plurality of function menus is referenced to the explanation provided above, and thus will not be explained redundantly.

Meanwhile, a name of a device that corresponds to the displayed function menu may be displayed on an upper portion of the first device menu area 190-D. For example, "TV", representing the display apparatus 100, may be displayed on the upper portion of the first display menu area (see FIG. 7), so that the user knows intuitively that the displayed function menu corresponds to TV.

Meanwhile, an icon to display a sub-page of the first page may be displayed on a lower portion of the first device menu area 190-D. The sub-page of the first page may display function menus other than the first function menu which are displayed on the first page, among the first function menus that are selected by the first remote controller 100-R and executed on the display apparatus 100. That is, the plurality of first function menus displayed on the first page may have higher frequency of selection by the user, compared to the plurality of first function menus displayed on the sub-page of the first page.

FIG. 8 illustrates the second page of the plurality of pages, in which the second device menu area 190-E is displayed. Referring to FIG. 8, the second device menu area 190-E may display a function menu to control the second device. The second device may refer to the first neighboring device 100-1. Accordingly, the second page of the plurality of pages may arrange and display one or more second function menus that are selected by the second remote controller 100-R-1 and executed on the first neighboring device 100-1. The manner of displaying a plurality of function menus is referenced to the explanation provided above, and will not be redundantly explained below.

The name of the displayed function menu may be displayed on an upper portion of the second device menu area 190-E. For example, referring to FIG. 8, if the first neighboring device 100-1 is a DVD player, "DVD", representing the first neighboring device 100-1, may be displayed on the upper portion of the second device menu area 190-E to enable the user to intuitively perceive that the displayed function menu corresponds to a DVD player.

Meanwhile, an icon to display a sub-page of the second page may be displayed on a lower portion of the second device menu area 190-E. The function menus that are selected by the second remote controller 100-R-1 and executed on the first neighboring device 100-1 may be arranged and displayed on the sub-page of the second page, except for the second function menus displayed on the second page. That is, the plurality of second function menus displayed on the second page may have higher frequency of selection by the user, compared to the plurality of second function menus displayed on the sub-page of the second page.

Figure 9:
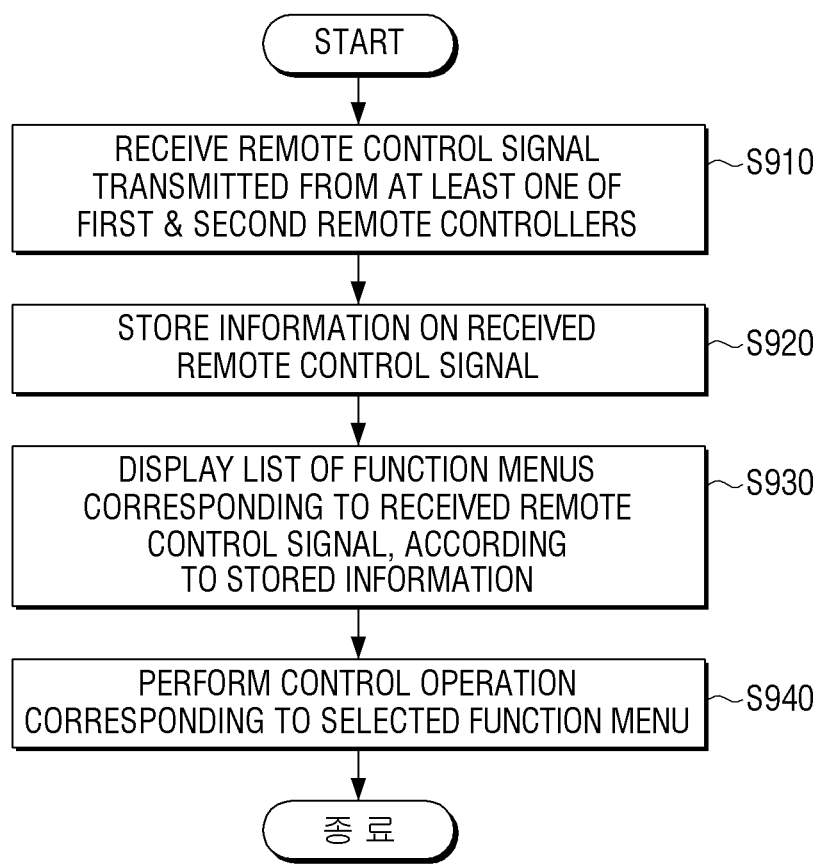
FIG. 9 is a flowchart provided to explain a display method according to an exemplary embodiment.

FIG. 9 is a flowchart provided to explain a display method according to an exemplary embodiment. In the following description, the like elements or operations that have been explained above will not be explained redundantly for the sake of brevity.

At S910, the display apparatus 100 receives a remote control signal transmitted from at least one of the first remote controller 100-R and the second remote controller 100-R-1. The first remote controller 100-R may generate a first remote control signal to control operation of the display apparatus 100, and the second remote controller 100-R-1 may generate a second remote control signal to control operation of the first neighboring device 100-1. The neighboring device is not limited to a specific example as explained herein.

At S920, the display apparatus 100 stores information about the received remote control signal. The display apparatus 100 may store the information about the received remote control signal according to frequency of selection made by the user. That is, with reference to the frequency of user selection, the display apparatus 100 may store the received remote control signal in sequential order.

At S930, the display apparatus 100 displays a list of function menus corresponding to the received remote control signal, according to the stored information. The list may display one or more function menus that are executed on the display apparatus 100 and the neighboring devices. Further, the display apparatus 100 may arrange the function menus with reference to the frequency of user selection and display the same.

After that, the display apparatus 100 may display a cursor to select a function menu from the list. Accordingly, the display apparatus 100 may move the cursor in accordance with the first remote control signal received from the first remote controller 100-R.

At S940, the display apparatus 100 performs control operation that corresponds to the selected function menu. That is, when one function menu that is executable by the display apparatus 100 is selected from the list, the display apparatus 100 may perform the control operation that corresponds to the selected function menu.

Meanwhile, the display apparatus 100 may communicate with the neighboring devices. Accordingly, when a function menu that is executable on the neighboring device is selected from the function menus displayed on the list, the display apparatus 100 may read out the corresponding remote control signal from the stored information and transmit the same to the neighboring device.

Figure 10:
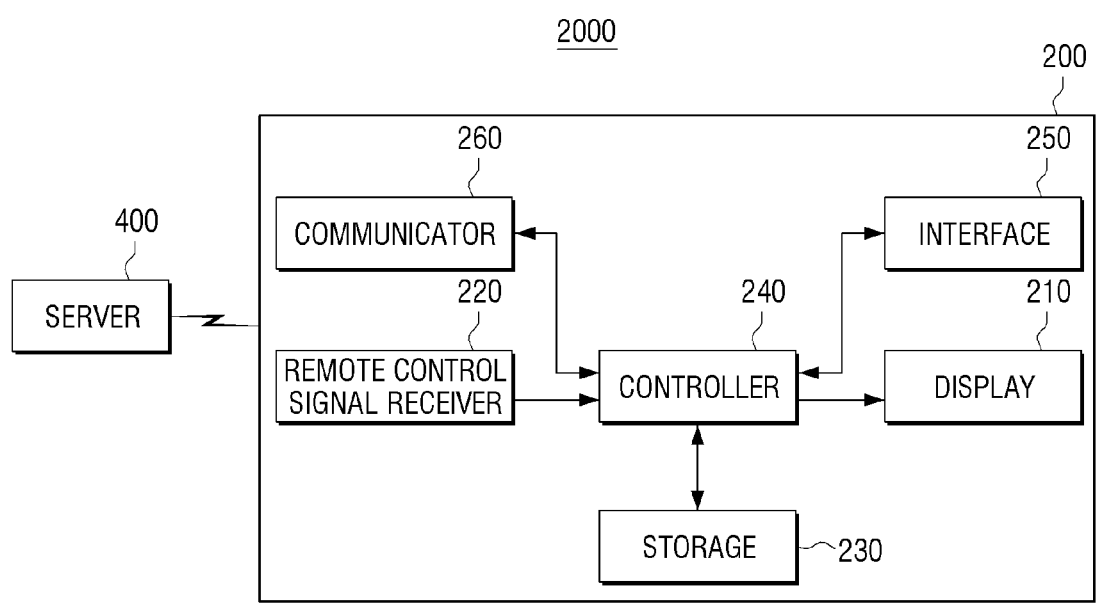
FIG. 10 is a block diagram of a display system according to another exemplary embodiment.

FIG. 10 is a block diagram of a display system 2000 according to another exemplary embodiment. Referring to FIG. 10, the display system 2000 includes a display apparatus 200 and a server 400. The display apparatus 200 may include a display 210, a remote control signal receiver 220, a storage 230, a controller 240, a communicator 260, and an interface 250. In the following description, the like elements or operations that have been explained above will not be redundantly explained for the sake of brevity.

The display apparatus 200 may interoperate with the server 400 via a network, and receive and store update information about one or more of the neighboring devices. The 'update information' as used herein may relate to update of key code signal and function signal which are the information included in the remote control signal.

The server 400 may store the update information about each of the display apparatus 200 and one or more neighboring devices, and transmit the update information to the communicator 260 of the display apparatus 200 via the network. The server 400 may be website of a manufacturer of the display apparatus 200 or the neighboring device. Further, the server 400 may be an information providing site for the display system 2000.

The communicator 260 is in communication with the server 400 via network. In response to a request of the controller 240, the communicator 260 may transmit information about the display apparatus 200 and the neighboring device, such as, for example, product number or serial number to the server 400, and receive update information from the server 400. The communicator 260 may communicate with the server 400 in a variety of manners. Further, the communicator 260 may have embedded communication chip for the purpose of communication with the server 400.

The update information received at the communicator 260 may be stored at the storage 230. Accordingly, the information about a variety of remote control signals stored at the storage 230 may be updated.

The interface 250 is configured to communicate with the neighboring devices. The interface 250 is electrically connected to the neighboring devices to transmit and receive data. That is, when a function menu of the neighboring device displayed on the display apparatus 200 is selected, the controller 240 may transmit a control signal corresponding to the selected function menu to a corresponding neighboring device via the interface 250. The neighboring device in receipt of the control signal may perform an operation that corresponds to the received control signal. Accordingly, when a function menu that can be executed on the neighboring device is selected from among the function menus displayed on the list, the controller 240 may read out a remote control signal that corresponds to the selected function menu from the storage 230 and transmit the same to the neighboring device via the interface 250.

Meanwhile, there may be a plurality of interfaces 250, in which case each of the neighboring devices may be connected to respective interfaces 250.

Figure 11:
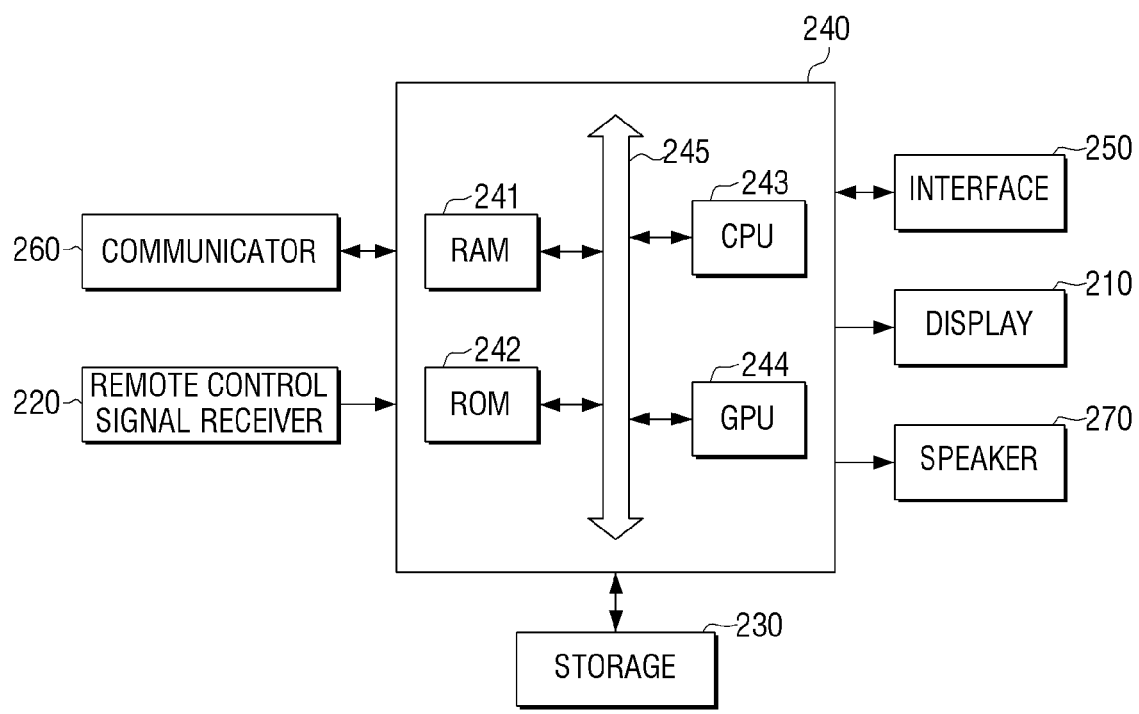
FIG. 11 is a detailed block diagram of a display apparatus according to another exemplary embodiment.

FIG. 11 is a detailed block diagram of a display apparatus 200 according to another exemplary embodiment. In the following description, the like elements or operations that have been explained above will not be explained redundantly for the sake of brevity.

Referring to FIG. 11, the display apparatus 200 may include a display 210, a remote control signal receiver 220, a storage 230, a controller 240, an interface 250, a communicator 260, and a speaker 270.

The display 210 may display a list of function menus that correspond to the received first remote control signal. The display 210 may be implemented, as non-limiting examples, as a liquid crystal display (LCD), an organic light emitting diode (OLED) display, a plasma display panel (PDP), or many others. The display 210 may additionally include a driving circuit (not shown) or backlight unit (not shown) which may be implemented in the form of, as non-limiting examples, a-si, TFT, low temperature poly silicon (LTPS) TFT, or organic TFT.

The remote control signal receiver 220 may receive a remote control signal transmitted from an external remote controller and transmit the same to the controller 240. The remote control signal receiver 220 may receive not only the remote control signal to control the display apparatus 200, but also a remote control signal to control the neighboring device. That is, the remote control signal receiver 220 may receive a remote control signal transmitted from at least one of a first remote controller 100-R to control the display apparatus 200, a second remote controller 100-R-1 to control the first neighboring device 100-1, and a third remote controller 100-R-2 to control the second neighboring device 100-2. Meanwhile, the remote control signal receiver 220 may be formed on an arbitrary location on the outer portion of the main body of the display apparatus 200, such as a front, a side or a rear portion.

The storage 230 is configured to store programs and data necessary for the operation of the display apparatus 200. The storage 230 may store not only information about the remote control signal to control the display apparatus 200, but also information about remote control signal to control the neighboring devices. That is, the storage 230 may store information included in the first remote control signal to control the display apparatus 200, information included in the second remote control signal to control the first neighboring device 100-1, and information included in the third remote control signal to control the second neighboring device 100-2. Further, the storage 230 may store the information about the received remote control signal according to a frequency of selection made by the user. Accordingly, the storage may store the information about the remote control signal in the order of higher frequency of user selection, arrange the function menus with reference to the frequency of user selection, and display the same.

The controller 240 controls the overall operation of the display apparatus 200. The controller 240 may include a random-access memory (RAM) 241, a read-only memory (ROM) 242, a central processing unit (CPU) 243, a graphics processing unit (GPU) 244, and a bus 245. The RAM 241, the ROM 242, the CPU 243 and the GPU 244 may be connected to each other via the bus 245.

The CPU 243 accesses the storage 230 and boots O/S stored in the storage 230. The CPU 243 performs a variety of operations using the programs, contents or data stored in the storage 230. The CPU 243 may also perform an operation in accordance with the received first remote control signal. That is, the CPU 243 may control the operation of the display apparatus 200 according to the received first remote control signal. When the user selects a command to control the operation of the neighboring device using a first remote controller 100-R as an integration remote controller, the CPU 243 may control the operation of the neighboring device. The ROM 242 stores a set of command languages for the purpose of system booting. With the supply of power in response to turn-on command, the CPU 243, according to the command stored in the ROM 242, copies the stored O/S of the storage 230 onto the RAM 241 and boots the system by executing the O/S. When booting completes, the CPU 243 copies the stored programs of the storage 230 onto the RAM 241, and executes the copied programs on the RAM 241 to perform corresponding operations.

When the display apparatus 200 completely boots, the GPU 244 displays item screen, content screen, or search result screen. That is, the GPU 244 may generate a screen that includes a plurality of objects such as icons, images, or texts, using a computing unit (not illustrated) or a renderer (not illustrated). The computing unit (not illustrated) may compute attribute values such as coordinates, configurations, sizes, or colors according to screen layout in which each of the objects is to be displayed. The renderer (not illustrated) generates a variety of layout screens including objects, based on the attribute values that are computed at the computing unit (not illustrated). The screen generated at the renderer (not illustrated) is provided to the display 210 and displayed within the display area. Meanwhile, the GPU 244 may arrange the function menus with reference to the frequency of user selection, into a list form. When one of the function menus is selected from the list, the CPU 243 performs control operation corresponding to the selected function menu.

The interface 250 is configured to communicate with the neighboring device. When a function menu of the neighboring device displayed on the display apparatus 200 is selected, the controller 240 may transmit a control signal that corresponds to the selected function menu to a corresponding neighboring device, via the interface 250.

The communicator 260 is configured to perform communication with the server 400 in a variety of communication manners. To be specific, the communicator 260 may transmit information about the display apparatus 200 and the neighboring device to the server 400, and receive corresponding update information from the server 400. The communicator 260 may include WiFi chip, Bluetooth chip, wireless communication chip, or NFC chip.

The WiFi chip, and Bluetooth chip perform communication in WiFi and Bluetooth manners, respectively. When using the WiFi chip or the Bluetooth chip, the connection-related information such as SSID or session key may be transmitted and received to connect communication based on the information, before the information is exchanged. The wireless communication chip may refer to a chip that performs communication according to a communication standard such as, for example, IEEE, Zigbee, 3rd generation (3G), 3rd generation partnership project (3GPP), long term evolution (LTE), and more. The NFC chip refers to a chip that operates in a near field communication (NFC) manner, using frequency band of 13.56 MHZ, among various RF-ID frequency bands such as 135 kHz, 13.56 MHz, 433 MHz, 860~960 MHz, 2.45 GHz.

Meanwhile, the communicator 260 may receive a broadcast signal. To output the received broadcast signal through the display 210 and the speaker 270, the received broadcast signal received at the communicator 260 may be outputted in the form of video and audio signals.

The display 210 and the speaker 270 may output video and audio signals from the received broadcast signal, respectively. The display apparatus 200 may additionally include a broadcast signal processor (not illustrated) configured to process the broadcast signal received at the communicator 260 into video data, audio data or other data. When the broadcast signal is received, the broadcast signal processor (not illustrated) may generate video frames and audio signals, by performing signal processing including demodulation, equalization, de-multiplexing, deinterleaving, or decoding with respect to the received broadcast signal. Accordingly, the video frames generated at the broadcast signal processor (not illustrated) are provided to the display 210, while the audio signals are provided to the speaker 270.

Although not illustrated in FIG. 11, in one or more exemplary embodiment, the display apparatus 200 may additionally include USB port to connect to USB connector, a variety of external input ports to connect to a variety of external terminals such as headset, mouse or LAN, or a DMB chip to receive and process a digital multimedia broadcasting (DMB) signal. Further, the various components of the display apparatus in one or more exemplary embodiment may be implemented as hardware, software, or a combination of hardware and software. For example, the described communicator, remote control signal receiver, controller, storage, display, and interface may each be hardware, software, or a combination of hardware and software.

Accordingly, the user can easily and efficiently search and select a control function, by manipulating a remote controller which is simple.

In various exemplary embodiments, the display method of the display apparatus may be stored on a non-transitory readable medium which may be loaded on a variety of devices to be used.

In one exemplary embodiment, a program code to implement a control method may be stored on a non-transitory readable medium and provided, in which the control method may include steps of receiving a remote control signal transmitted from at least one of a first remote controller 100-R to control a display apparatus and a first remote controller 100-R-1 to control the neighboring device, storing information about the received remote control signal, displaying a list of function menus corresponding to the received remote control signal in accordance with the stored information, and when one function menu is selected from the list, performing a control operation that corresponds to the selected function menu.

The 'non-transitory readable medium' as used herein refers to a medium configured to semi-permanently store data and enable reading by a device, rather than a medium that stores data for a relatively brief period of time, such as register, cache, or memory. To be specific, CD, DVD, hard disc, Blu-ray disc, USB, memory card or ROM are the examples of non-transitory readable mediums.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, not to limit the scope of the claims, and many alternatives, modifications, and variations will be apparent to those skilled in the art.

What is claimed is:

1. A display apparatus, comprising:
   a remote control signal receiver configured to receive a remote control signal transmitted from a first remote controller which controls the display apparatus and at least one second remote controller which controls at least one peripheral device;
   a display;
   a storage configured to store information related to the remote control signal, the information related to the remote control signal comprising at least one from among identification information of the display apparatus, a control code of the display apparatus, and information related to the at least one second remote controller; and
   a controller configured to control the display to display a list of function menus corresponding to the remote control signal based on the stored information and in response to a function menu being selected from the list, perform an operation that corresponds to the selected function menu,
   wherein the controller obtains the list of function menus including at least one first function menu and at least one second function menu, and
   wherein the at least one first function menu corresponds to first functions that are based on the previously stored information related to the remote control signal, the first functions having been selected by the first remote controller and executed on the display apparatus before the remote control signal is received and the at least one second function menu corresponds to second functions that are based on the previously stored information related to the remote control signal, the second functions having been selected by the at least one second remote controller and executed on the at least one peripheral device before the remote control signal is received.

2. The display apparatus of claim 1, wherein the controller is further configured to construct the list by arranging the function menus with reference to a frequency of selection made by a user.

3. The display apparatus of claim 1, further comprising an interface configured to communication with the at least one peripheral device, wherein
   on a condition that the selected function menu is executable by the at least one peripheral device, the controller is further configured to transmit a corresponding remote control signal to the at least one peripheral device via the interface.

4. The display apparatus of claim 1, wherein the controller is further configured to control the display to display a cursor configured to aid in the selection of the function menus on the list and to move the cursor in accordance with a remote control signal received from the first remote controller.

5. The display apparatus of claim 1, wherein the list is divided into at least one page configured to display the at least one first function menu selected by the first remote controller and executable by the display apparatus and the at least one second function menu selected by the at least one second remote controller and executable by the at least one peripheral device.

6. The display apparatus of claim 1, wherein the list is divided into a plurality of pages, wherein
   a first page of the plurality of pages displays an arrangement of the at least one first function menu selected by the first remote controller and executable by the display apparatus, and
   a second page of the plurality of pages displays an arrangement of the at least one second function menu selected by the at least one second remote controller and executable by the at least one peripheral device.

7. The display apparatus of claim 1, wherein the at least one peripheral device comprises a plurality of different types of devices, and the at least one second remote controller comprises a plurality of remote controllers corresponding to the plurality of different types of devices, respectively.

8. The display apparatus of claim 1, wherein the information comprises at least one from among a control code included in the remote control signal, identification information of the at least one peripheral device, and identification information of the at least one second remote controller.

9. A control method of a display apparatus, comprising:
   receiving a remote control signal transmitted from a first remote controller which controls the display apparatus and at least one second remote controller which controls at least one peripheral device;
   storing information related to the remote control signal, the information related to the remote control signal comprising at least one from among identification information of the display apparatus, a control code of the display apparatus, and information related to the at least one second remote controller; and
   obtaining a list of function menus including at least one first function menu and at least one second function menu,
   wherein the at least one first function menu corresponds to first functions that are based on the previously stored information related to the remote control signal, the first functions having been selected by the first remote controller and executed on the display apparatus before the remote control signal is received, and the at least one second function menu corresponds to second functions that are based on the previously stored information related to the remote control signal, the second functions having been selected by the at least one second remote controller and executed on the at least one peripheral device before the remote control signal is received.

10. The control method of claim 9, further comprising constructing the list by arranging the function menus with reference to a frequency of selection made by a user.

11. The control method of claim 9, further comprising communicating with the at least one peripheral device, wherein
    the controlling the operation comprises, on a condition that the selected function menu is executable by the at least one peripheral device, transmitting a corresponding remote control signal to the at least one peripheral device.

12. The control method of claim 9, further comprising:
    displaying a cursor to select the function menus on the list; and
    moving the cursor in accordance with a remote control signal received from the first remote controller.

13. The control method of claim 9, wherein the list is divided into at least one page configured to display the at least one first function menu selected by the first remote controller and executable by the display apparatus and the at least one second function menu selected by the at least one second remote controller and executable by the at least one peripheral device.

14. The control method of claim 9, wherein the list is divided into a plurality of pages, wherein
- a first page of the plurality of pages displays an arrangement of the at least one first function menu selected by the first remote controller and executable by the display apparatus, and
- a second page of the plurality of pages displays an arrangement of the at least one second function menu selected by the at least one second remote controller and executable by the at least one peripheral device.

15. The control method of claim 9, wherein the at least one peripheral device comprises a plurality of different types of devices, and the at least one second remote controller comprises a plurality of remote controllers corresponding to the plurality of different types of peripheral devices, respectively.

16. The control method of claim 9, wherein the information comprises at least one from among a control code included in the remote control signal, identification information of the at least one peripheral device, and identification information of the at least one second remote controller.

17. The display apparatus as claimed in claim 1, further comprising:
- a communicator configured to receive update information related to the remote control signal,
- wherein the controller is further configured to adjust the stored information based on the update information.

18. The control method of claim 9, further comprising:
- storing the information related to the remote control signal in a storage.

* * * * *